US007879958B2

(12) United States Patent
Luo et al.

(10) Patent No.: US 7,879,958 B2
(45) Date of Patent: Feb. 1, 2011

(54) POLYHYDROXY COMPOUNDS AS POLYMERIZATION QUENCHING AGENTS

(75) Inventors: Steven Luo, Copley, OH (US); Timothy L. Tartamella, Silver Lake, OH (US); Mark W. Smale, Hudson, OH (US); Kevin M. McCauley, Coventry Township, OH (US); Zhong-Ren Chen, Stow, OH (US)

(73) Assignee: Bridgestone Corporation (JP)

( * ) Notice: Subject to any disclaimer, the term of this patent is extended or adjusted under 35 U.S.C. 154(b) by 45 days.

(21) Appl. No.: 11/890,591

(22) Filed: Aug. 7, 2007

(65) Prior Publication Data

US 2009/0043055 A1 Feb. 12, 2009

(51) Int. Cl.
*C08F 2/38* (2006.01)
*C08F 6/02* (2006.01)
*C08F 36/04* (2006.01)

(52) U.S. Cl. ............................ 526/84; 526/83; 526/164; 526/169.1; 526/173; 526/902; 528/495; 528/496

(58) Field of Classification Search ................ 526/84, 526/83, 164, 169.1, 173, 902; 528/495, 496
See application file for complete search history.

(56) References Cited

U.S. PATENT DOCUMENTS

| 3,297,667 | A |   | 1/1967  | von Dohlen et al. |
|-----------|---|---|---------|-------------------|
| 3,541,063 | A |   | 11/1970 | Throckmorton et al. |
| 3,542,716 | A | * | 11/1970 | Muller .................. 526/83 |
| 3,649,606 | A |   | 3/1972  | Watson et al. |
| 3,753,960 | A | * | 8/1973  | Easterbrook et al. .......... 526/83 |
| 3,794,604 | A |   | 2/1974  | Throckmorton et al. |
| 3,808,184 | A | * | 4/1974  | Sheth et al. .................. 528/492 |
| 4,696,984 | A |   | 9/1987  | Carbonaro et al. |
| 4,710,553 | A |   | 12/1987 | Carbonaro et al. |
| 4,736,001 | A |   | 4/1988  | Carbonaro et al. |
| 7,094,849 | B2 |  | 8/2006  | Luo et al. |
| 7,351,776 | B2 |  | 4/2008  | Tartamella et al. |
| 2005/0197474 | A1 | * | 9/2005 | Tartamella et al. .......... 526/335 |
| 2007/0244273 | A1 | * | 10/2007 | Blackmon et al. ............. 526/82 |
| 2008/0214760 | A1 | * | 9/2008  | Hsieh et al. ................. 526/200 |

FOREIGN PATENT DOCUMENTS

WO WO 2005087824 A 9/2005

OTHER PUBLICATIONS

Z. Shen, J. Ouyang, F. Wang, Z. Hu, F. Yu, and B. Qian, Journal of Polymer Science: Polymer Chemistry Edition, 1980, vol. 18, pp. 3345-3357.
H. L. Hsieh, H. C. Yeh, Rubber Chemistry and Technology, 1985, vol. 58., pp. 117-145.
D. J. Wilson, Journal of Polymer Science, Part A, Polymer Chemistry, 1995, vol. 33, pp. 2505-2513.
R. P. Quirk, A. M. Kells, Polymer International, 2000, vol. 49, pp. 751-756.
European Search Report, Application No. EP 08 25 2614 dated Oct. 27, 2008.

* cited by examiner

*Primary Examiner*—Fred M Teskin
(74) *Attorney, Agent, or Firm*—Meredith E. Hooker; Arthur Reginelli

(57) ABSTRACT

A method for quenching an active polymerization mixture, the method comprising introducing a polyhydroxy compound to an active polymerization mixture.

37 Claims, No Drawings

POLYHYDROXY COMPOUNDS AS POLYMERIZATION QUENCHING AGENTS

FIELD OF THE INVENTION

One or more embodiments of the present invention are directed toward the use of polyhydroxy compounds as quenching agents in polymerization processes.

BACKGROUND OF THE INVENTION

Polymers may be produced by solution polymerization, wherein monomer is polymerized in an inert solvent or diluent. The solvent may serve to solubilize the reactants and products, act as a carrier for the reactants and products, aid in the transfer of the heat of polymerization, and help in moderating the polymerization rate. The solvent may allow easier stirring and transferring of the polymerization mixture (also called cement). Nevertheless, the presence of solvent can present a number of difficulties. The solvent must be separated from the rubber and then recycled for reuse or otherwise disposed of. The cost of recovering and recycling the solvent adds to the cost of the rubber being produced, and there is the risk that the recycled solvent after purification may still retain some impurities that will poison the polymerization catalyst. In addition, some solvents, such as aromatic hydrocarbons, can raise environmental concerns. Further, the purity of the polymer product may be affected if there are difficulties in removing the solvent.

Polymers may also be produced by bulk polymerization (also called mass polymerization), wherein the monomer is polymerized in the absence or substantial absence of any solvent, and, in effect, the monomer itself acts as a diluent. Since bulk polymerization is essentially solventless, there is less contamination risk, and the product separation is simplified. Bulk polymerization offers a number of economic advantages including lower capital cost for new plant capacity, lower energy cost to operate, and fewer people to operate. The solventless feature also provides environmental advantages, with emissions and waste water pollution being reduced.

Despite its many advantages, bulk polymerization requires careful temperature control, and there is also the need for strong and elaborate stirring equipment since the viscosity of the polymerization system can become very high. In the absence of added diluent, the cement viscosity and exotherm effects can make temperature control difficult. Consequently, local hot spots may occur, resulting in degradation, gelation, and/or discoloration of the polymer product. In the extreme case, uncontrolled acceleration of the polymerization rate can lead to disastrous "runaway" reactions. Because of these difficulties, bulk polymerization has not been widely utilized in the commercial production of synthetic rubbers.

Due to the need to control polymer cement viscosity and exotherm, bulk polymerization may be run to substantially less than 100% monomer conversion, and the remaining monomer is recycled. As in the case of solution polymerization, it is generally necessary to add a quenching agent to the polymerization mixture to inactivate the reactive polymer chains, the catalyst and/or the catalyst components prior to the isolation and drying of the polymer product. Without adding the quenching agent, unwanted side reactions such as crosslinking, coupling, and oxidation reactions can occur when the living or pseudo-living polymer and the active catalyst or catalyst components are exposed to air during the isolation and drying of the polymer.

Various quenching agents have been used in the prior art. Water, alcohols, and carboxylic acids have been commonly used, but they can contaminate the recycled monomer stream due to their low boiling points and high vapor pressures. To alleviate the monomer contamination problem, long-chain alcohols such as n-octanol and long-chain carboxylic acids such as 2-ethylhexanoic acid (EHA) and distilled tall oil (DTO), which have higher boiling points and lower vapor pressures, may be used. Unfortunately, due to the high molecular weights of these long-chain alcohols and carboxylic acids, high loadings of quenching agents are often required to effectively quench the polymerization mixture. These high loadings can result in the formation of high levels of metal alkoxide or metal carboxylate salts as foreign substances in the polymer product. The presence of these foreign substances can adversely affect the rubber vulcanization rate as well as the properties of rubber vulcanizates. For example, the presence of high levels of the metal salts can give poor vulcanizate properties.

SUMMARY OF THE INVENTION

One or more embodiments of the present invention provide a method for quenching an active polymerization mixture, the method comprising introducing a polyhydroxy compound to an active polymerization mixture.

One or more embodiments of the present invention also provide a method for preparing a polymer, the method comprising the steps of (a) introducing monomer and a catalyst to form an active polymerization mixture that includes less than 20% by weight of solvent, and (b) adding a polyhydroxy compound to the active polymerization mixture.

One or more embodiments of the present invention further provide a continuous polymerization method for preparing a polymer, the method comprising the steps of (a) continuously introducing monomer and a catalyst to form an active polymerization mixture that includes less than 20% by weight of solvent, (b) allowing at least a portion of the monomer to polymerize within a first zone, (c) continuously removing the active polymerization mixture from the first zone and transferring the mixture to a second zone, (d) continuously introducing a polyhydroxy compound to the active polymerization mixture within the second zone to form a polymerization mixture that is at least partially quenched.

One or more embodiments of the present invention also provide a polymer prepared by a process comprising introducing a polyhydroxy compound to an active polymerization mixture.

DETAILED DESCRIPTION OF ILLUSTRATIVE EMBODIMENTS

According to one or more embodiments of the present invention, a polyhydroxy compound is introduced to an active polymerization mixture. In one or more embodiments, the active polymerization mixture may include polymer (propagating and/or non-propagating), unreacted monomer, catalyst, catalyst components, catalyst residue, optionally functionalized or coupled polymer, and optionally solvent.

In one or more embodiments, the introduction of the polyhydroxy compound to the active polymerization mixture partially quenches the polymerization mixture. In other embodiments, the introduction of the polyhydroxy compound to the active polymerization mixture completely quenches the polymerization mixture. In one or more embodiments, quenching of an active polymerization mixture may include stopping the polymerization of monomer. In certain embodiments, quenching of an active polymerization mixture may include deactivating a propagating polymer such as a living or pseudo-living polymer via protonation or other reactions. In these or other embodiments, quenching of an active polymerization mixture may include deactivating catalyst, catalyst components and/or catalyst residue via protonation or other reactions.

Since polyhydroxy compounds carry two or more active hydroxy groups per molecule, lesser amounts of polyhydroxy compounds can be employed to quench an active polymerization mixture. Therefore, in one or more embodiments, the use of polyhydroxy compounds as quenching agents advantageously provides polymeric compositions containing lower levels of foreign substances than polymeric compositions obtained by employing monohydroxy compounds as quenching agents. Also, in one or more embodiments, especially in polymerization processes where the unreacted monomer is recycled, separation of the monomer from polyhydroxy compounds can be efficiently achieved by taking advantage of the high boiling points of polyhydroxy compounds, and therefore the contamination of the recycled monomer by quenching agents can be reduced.

The active polymerization mixture can be prepared by any polymerization methods known in the art. Various types of monomer, catalyst, and solvent can be employed as ingredients for preparing the active polymerization mixture. The practice of one or more embodiments of the present invention is not limited by the selection of any particular polymerization method or any particular types of ingredients used to prepare the polymerization mixture.

In one or more embodiments, monomers include those capable of being polymerized by chain polymerization mechanisms. In particular embodiments, monomers include conjugated diene monomers optionally together with monomers copolymerizable with conjugated diene monomers. Examples of conjugated diene monomers include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more of the foregoing diene monomers may be employed. Examples of monomer copolymerizable with diene monomer include vinyl-substituted aromatic monomer such as styrene, p-methylstyrene, α-methylstyrene, and vinylnaphthalene.

In one or more embodiments, polymers may include non-propagating polymeric species that cannot undergo further polymerization through the addition of monomer. Polymers may also include propagating polymeric species that are capable of undergoing further polymerization through the addition of monomer. Included are polymers capable of undergoing further chain polymerization. In one or more embodiments, the propagating polymeric species include an anion or negative charge at their active terminus. These polymers may include those initiated by an anionic initiator or a coordination catalyst. In these or other embodiments, the propagating polymeric species may be referred to as a living or pseudo-living polymer, or simply as a reactive polymer.

In one or more embodiments, the active polymerization mixture may optionally include functionalized or coupled polymers that contain a residue of a functionalizing agent. In one or more embodiments, the functionalized polymers are no longer able to undergo further polymerization through monomer addition.

In one or more embodiments, catalysts or active catalysts may include metal compounds or the reaction products (i.e., catalyst residue) of metal compounds and/or co-catalysts. The catalysts, which may also be referred to as initiators, may include those metal compounds that are capable of polymerizing monomer by chain polymerization mechanisms. For example, in anionic polymerization, the catalyst may include an alkyllithium compound that acts as an anionic initiator. In other examples, such as in coordination polymerization, the active catalyst may include one or more organometallic species or the reaction products thereof.

In one or more embodiments, an anionic polymerization catalyst or initiator may be employed. The key mechanistic features of anionic polymerization have been described in books (e.g., Hsieh, H. L.; Quirk, R. P. Anionic Polymerization: Principles and Practical Applications; Marcel Dekker: New York, 1996) and review articles (e.g., Hadjichristidis, N.; Pitsikalis, M.; Pispas, S.; Iatrou, H.; Chem. Rev. 2001, 101 (12), 3747-3792). The initiator is believed to react with monomer to produce an anionic intermediate that is capable of reacting with additional monomer to produce a growing polymer chain. Anionic polymerization has been used with a wide range of monomers including styrenes, acrylates, epoxides, lactones, siloxanes, and conjugated dienes.

Examples of anionic polymerization initiators include alkyllithium compounds such as ethyllithium, n-propyllithium, isopropyllithium, n-butyllithium, sec-butyllithium, tertiary-butyllithium, n-amyllithium, isoamyllithium, and phenyllithium. Other examples include alkyl magnesium bromide compounds such as butylmagnesium bromide and phenylmagnesium bromide. Still other systems include alkyl and phenyl sodium compounds such as trimethylphenylsodium.

In other embodiments, a coordination catalyst may be employed. Coordination catalysts are believed to initiate the polymerization of monomer by a mechanism involving the coordination or complexation of monomer to an active metal center prior to the insertion of monomer into a growing polymer chain. The key features of coordination catalysts have been discussed in many books (e.g., Kuran, W., *Principles of Coordination Polymerization*; John Wiley & Sons: New York, 2001) and review articles (e.g., Mulhaupt, R., *Macromolecular Chemistry and Physics* 2003, volume 204, pages 289-327). An advantageous feature of coordination catalysts is their ability to provide stereochemical control of polymerizations and thereby produce stereoregular polymers. As is known in the art, there are numerous methods for generating coordination catalysts, but all methods eventually generate an active intermediate that is capable of coordinating with monomer and inserting monomer into a covalent bond between an active metal center and a growing polymer chain. The coordination polymerization of conjugated dienes is believed to proceed via pi-allyl complexes as intermediates. Coordination catalysts can be one-, two-, three- or multi-component systems. In one or more embodiments, a coordination catalyst may be formed by combining a heavy metal compound (e.g., a transition metal compound or a lanthanide compound), an alkylating agent (e.g., an organoaluminum compound), and optionally other co-catalyst components.

Various procedures can be used to prepare coordination catalysts. In one or more embodiments, a coordination catalyst may be formed in situ by separately adding the catalyst components to the monomer to be polymerized in either a stepwise or simultaneous manner. In other embodiments, a coordination catalyst may be preformed. That is, the catalyst components are pre-mixed outside the polymerization system either in the absence of any monomer or in the presence of a small amount of monomer. The resulting preformed catalyst composition may be aged, if desired, and then added to the monomer that is to be polymerized.

Examples of coordination catalyst systems include nickel-based systems, cobalt-based systems, and lanthanide-based systems. Useful nickel-based catalyst systems are disclosed in U.S. Pat. Nos. 6,479,601, 6,451,934, 4,562,172, 4,562,171, and 4,223,116, which are incorporated herein by reference. Useful cobalt-based systems are disclosed in U.S. Pat. Nos. 6,479,601, 4,954,125, 4,562,172, 4,562,171, and 4,522,988, which are incorporated herein by reference. Useful lanthanide-based catalyst systems are disclosed in U.S. Pat. Nos. 6,897,270, 7,094,849, 6,992,147, and 7,008,899, which are incorporated herein by reference; as well as U.S. Publication Nos. 2008/0146745 A1, 2007/0149717 A1, 2007/0276122 A1, and 2008-0051552 A1, which are incorporated herein by reference. In particular embodiments, a lanthanide-based catalyst system is employed for polymerizing conjugated diene monomers into cis-1,4-polydienes.

In one or more embodiments, the polymerization mixture may optionally include a solvent. Suitable solvents include those organic compounds that will not undergo polymerization or incorporation into the propagating polymer chain in the presence of catalyst. In one or more embodiments, these organic species are liquid at ambient temperature and pressure. In one or more embodiments, these organic solvents are inert to the catalyst composition. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Commercial mixtures of the above hydrocarbons may also be used. For environmental reasons, aliphatic and cycloaliphatic hydrocarbons are highly preferred. The low-boiling hydrocarbon solvents are typically separated from the polymer upon completion of the polymerization.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer.

The polymerization mixture can be prepared by combining or introducing monomer, a catalyst that can initiate the polymerization of monomer under appropriate conditions, optionally solvent, and optionally a functionalizing or coupling agent.

In one or more embodiments, the amount of catalyst employed to initiate the polymerization may depend on several factors. For example, the amount may depend on the type of catalyst employed, the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalysts or catalyst ingredients may be used.

In one or more embodiments, where an anionic polymerization initiator such as an alkyllithium compound is employed, the initiator loading may be varied from about 0.05 to about 100 mmol, in other embodiments from about 0.1 to about 50 mmol, and in still other embodiments from about 0.2 to about 5 mmol per 100 gram of monomer.

In other embodiments, where a coordination catalyst (e.g., a lanthanide-, nickel- or cobalt-based catalyst) is employed, the amount of the coordinating metal compound used can be varied from about 0.001 to about 1 mmol, in other embodiments from about 0.005 to about 0.5 mmol, and in still other embodiments from about 0.01 to about 0.2 mmol per 100 gram of monomer.

In one or more embodiments, the polymerization system employed may be generally considered a solution polymerization system that includes a substantial amount of solvent. In these cases, the solvent content of the polymerization mixture may be more than 20% by weight, in other embodiments more than 50% by weight, and in still other embodiments more than 80% by weight based on the total weight of the polymerization mixture. Examples of suitable solvents have been set forth above.

In other embodiments, the polymerization system employed may be generally considered a bulk polymerization system that includes substantially no solvent or a minimal amount of solvent. In these cases, the solvent content of the polymerization mixture may be less than about 20% by weight, in other embodiments less than about 10% by weight, and in still other embodiments less than about 5% by weight based on the total weight of the polymerization mixture. In still another embodiment, the polymerization mixture is substantially devoid of solvent, which refers to the absence of that amount of solvent that would otherwise have an appreciable impact on the polymerization process. In other embodiments, those skilled in the art will appreciate the benefits of bulk polymerization processes (i.e., processes where monomer acts as the solvent), and therefore the polymerization mixture includes less solvent than will deleteriously impact the benefits sought by conducting bulk polymerization. In particular embodiments, the polymerization mixture is devoid of solvent.

Regardless of the type of polymerization system employed, in certain embodiments, a small quantity of an organic solvent, which can be either low-boiling or high-boiling, may be employed as a carrier to either dissolve or suspend the catalyst ingredients in order to facilitate the delivery of the catalyst ingredients to the polymerization system. In another embodiment, monomer can be used as the catalyst carrier. In yet another embodiment, the catalyst ingredients can be used in their neat state without any solvent.

The polymerization may be conducted by employing any conventional techniques known in the art. In one or more embodiments, solution polymerization can be conducted in a conventional stirred-tank reactor. In other embodiments, bulk polymerization can be conducted in a conventional stirred-tank reactor if the monomer conversion is less than about 60%. In still other embodiments, where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose.

In one or more embodiments, all of the ingredients used to prepare the polymerization mixture can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a portion thereof) may be conducted. For example, and as is known in the art, it may be advantageous to combine certain catalyst ingredients in the absence or presence of monomer and allow them to age before initiating polymerization. Techniques of this type are disclosed in U.S. Pat. Nos. 6,699,813, 6,897,270, and 7,094,849, which are incorporated herein by reference.

Once all of the ingredients are introduced, the polymerization of the monomer may be allowed to proceed. The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

Once a desired monomer conversion is achieved, a functionalizing agent may optionally be introduced into the polymerization mixture to react with any reactive polymer chains so as to give a functionalized polymer. In one or more embodiments, the functionalizing agent is introduced prior to contacting the polymerization mixture with a quenching agent (e.g., polyhydroxy compound). In other embodiments, the functionalizing agent may be introduced after the polymerization mixture has been partially quenched with a quenching agent.

The selection of a functionalizing agent may depend upon the catalyst system employed and/or the nature of the reactive polymer chains. In one or more embodiments, functionalizing agents include those compounds or reagents that can react with a reactive polymer and thereby provide the polymer with a reactive group that is distinct from a propagating chain that has not been reacted with the functionalizing agent. The reactive group may be reactive or interactive with other polymer chains (propagating and/or non-propagating) or with other constituents that may be combined with the polymer such as reinforcing fillers (e.g., carbon black). In one or more embodiments, the reaction between the functionalizing agent and the reactive polymer proceeds via an addition or substitution reaction.

In one or more embodiments, functionalizing agents include coupling agents that serve to combine two or more reactive polymer chains in a single macromolecule. In other embodiments, functionalizing agents include compounds that will add or impart a heteroatom to the polymer chain. In particular embodiments, functionalizing agents include those compounds that will impart a group to the polymer chain that reduces the 50° C. hysteresis loss of a carbon-black filled vulcanizates prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In those embodiments where an anionic initiator such as an alkyllithium compound is employed as the polymerization catalyst, the resulting living anionic polymer can be reacted with a compound that will impart a functional group to the terminus of the polymer. Types of compounds that have been used to functionalize living anionic polymers include carbon dioxide, benzophenones, benzaldehydes, imidazolidinones, pyrrolidinones, carbodiimides, ureas, isocyanates, and Schiff bases including those disclosed in U.S. Pat. Nos. 3,109,871, 3,135,716, 5,332,810, 5,109,907, 5,210,145, 5,227,431, 5,329,005, 5,935,893, which are incorporated herein by reference. Other examples include trialkyltin halides such as triisobutyltin chloride, as disclosed in U.S. Pat. Nos. 4,519, 431, 4,540,744, 4,603,722, 5,248,722, 5,349,024, 5,502,129, and 5,877,336, which are incorporated herein by reference. Other examples include cyclic amino compounds such as hexamethyleneimine alkyl chloride, as disclosed in U.S. Pat. Nos. 5,786,441, 5,916,976 and 5,552,473, which are incorporated herein by reference. Other examples include N-substituted aminoketones, N-substituted thioaminoketones, N-substituted aminoaldehydes, and N-substituted thioaminoaldehydes, including N-methyl-2-pyrrolidinone or 1,3-dimethyl-2-imidazolidinone (i.e., N,N'-dimethylethyleneurea) as disclosed in U.S. Pat. Nos. 4,677,165, 5,219,942, 5,902,856, 4,616,069, 4,929,679, and 5,115,035, which are incorporated herein by reference. Additional examples include sulfur-containing or oxygen containing azaheterocycles such as disclosed in WO 2004/020475, U.S. Publication No. 2006/0178467 A1 and U.S. Pat. No. 6,596,798, which are incorporated herein by reference. Other examples include boron-containing terminators such as disclosed in U.S. Ser. No. 11/189,891, which is incorporated herein by reference. Still other examples include cyclic siloxanes such as hexamethylcyclotrisiloxane, including those disclosed in co-pending U.S. Publication No. 2007/0149744 A1, which is incorporated herein by reference.

In one or more embodiments, especially where a lanthanide-based coordination catalyst system is employed to produce a pseudo-living polymer, suitable functionalizing agents include those compounds that may contain groups such as ketone, aldehyde, amide, ester, imidazolidinone, isocyanate, and isothiocyanate groups. Examples of these compounds are disclosed in U.S. Publication Nos. 2006/0004131 A1, 2006/0025539 A1, 2006/0030677 A1, and U.S. Pat. No. 7,294,680, which are incorporated herein by reference. Other examples of functionalizing agents include azine compounds as described in U.S. Publication No. 2007/0149717 A1, hydrobenzamide compounds as disclosed in U.S. Publication No. 2007/0276122 A1, nitro compounds as disclosed in U.S. Publication No. 2008/0051552 A1, and protected oxime compounds as disclosed in U.S. Publication No. 2008/0146745 A1, all of which are incorporated herein by reference. Still others are disclosed in U.S. Pat. Nos. 4,906,706, 4,990,573, 5,064,910, 5,567,784, and 5,844,050, 6,992,147, 6,977,281; U.S. Publication No. 2006/0004131A1; Japanese Patent Application Nos. 05-051406A, 05-059103A, 10-306113A, and 11-035633A, which are incorporated herein by reference.

Useful functionalizing agents that can be used to couple reactive polymer chains, which compounds may also be referred to as coupling agents, include any of those known in the art including, but not limited to, metal halides such as tin tetrachloride, metalloid halides such as silicon tetrachloride, ester carboxylate metal complexes such as dioctyltin bis(octylmaleate), alkoxysilanes such as tetraethyl orthosilicate, and alkoxystannanes such as tetraethoxytin. Coupling agents can be employed either alone or in combination with other functionalizing agents. The combination of functionalizing agents may be used in any molar ratio.

In one embodiment, the functionalizing agent may be added to the polymerization mixture once a peak polymerization temperature is observed. In other embodiments, the functionalizing agent may be added within about 25 to 35 minutes after the peak polymerization temperature is reached.

In one or more embodiments, the functionalizing agent may be introduced to the polymerization mixture after a desired monomer conversion but before the addition of the polyhydroxy compound. In one or more embodiments, the functionalizing agent is added to the polymerization mixture after a monomer conversion of at least 5%, in other embodiments at least 10% monomer conversion, in other embodiments at least 20% monomer conversion, in other embodiments at least 50% monomer conversion, and in other embodiments at least 80% monomer conversion. In these or other embodiments, the functionalizing agent is added to the polymerization mixture prior to a monomer conversion of 90%, in other embodiments prior to 70% monomer conversion, in other embodiments prior to 50% monomer conversion, in other embodiments prior to 20% monomer conversion, and in other embodiments prior to 15% monomer conversion. In one or more embodiments, the functionalizing agent is added after complete, or substantially complete monomer conversion. In particular embodiments, a functionalizing agent may be introduced to the polymerization mixture immediately prior to, together with, or after the introduction of a Lewis base as disclosed in co-pending U.S. Serial Publication No. 2009/0043046 A1 entitled Process for Producing Functionalized Polymers, and is incorporated herein by reference.

In one or more embodiments, the functionalizing agent may be introduced to the polymerization mixture at a location (e.g., within a vessel) where the polymerization of monomer (or at least a portion thereof) has taken place. In other embodiments, the functionalizing agent may be introduced to the polymerization mixture at a location that is distinct from where the polymerization of monomer (or at least a portion thereof) has taken place. For example, the functionalizing agent may be introduced to the polymerization mixture in downstream vessels including downstream reactors or tanks, in-line reactors or mixers, extruders, or devolatilizers.

In particular embodiments, the polymerization process is a continuous process where the introduction of the functionalizing agent occurs within a distinct zone of the process. For example, the polymerization of monomer (or at least a portion thereof) occurs within a zone of the process (e.g., a reactor), which zone may be referred to as a first zone. After a desired monomer conversion, the polymerization mixture is removed from the first zone and introduced to a subsequent zone (e.g., a downstream reactor), which may be referred to as a second zone, where the functionalizing agent can be introduced to the polymerization mixture. In particular embodiments, especially where bulk polymerization is conducted, the polymerization mixture is removed from the first zone prior to complete monomer conversion (e.g., prior to 50% conversion), and the functionalizing agent is added to the polymerization mixture in the second zone.

The amount of functionalizing agent introduced to the polymerization mixture may depend upon various factors including the type and amount of catalyst used to initiate the polymerization, the type of functionalizing agent, the desired level of functionality and many other factors.

In one or more embodiments, where an anionic polymerization initiator such as an alkyllithium compound is employed, the amount of functionalizing agent may be varied from about 0.05 to about 10 moles, in other embodiments from about 0.1 to about 5 moles, and in still other embodiments from about 0.2 to about 2 moles per mole of the anionic polymerization initiator.

In other embodiments, where a lanthanide-based catalyst is employed, the amount of functionalizing agent may be in a range of from about 1 to about 200 moles, in other embodiments from about 5 to about 150 moles, and in other embodiments from about 10 to about 100 moles per mole of the lanthanide Once a desired monomer conversion has been achieved and a functionalizing agent has optionally been introduced, the polymerization mixture may be quenched by the introduction of a polyhydroxy compound. In one or more embodiments, the polyhydroxy compound can be introduced as a neat material to the polymerization mixture. In other embodiments, the polyhydroxy compound can be diluted with a solvent or monomer prior to being introduced into the polymerization mixture.

In one or more embodiments, polyhydroxy compounds include those compounds containing two or more hydroxy groups (i.e., OH) per molecule. In one or more embodiments, the polyhydroxy compounds may be characterized by an equivalent molecular weight of less than 100 g/mole, in other embodiments less than 80 g/mole, in other embodiments less than 60 g/mole, and in other embodiments less than 40 g/mole, where the equivalent molecular weight is defined as the molecular weight of a polyhydroxy compound divided by the number of hydroxy groups per molecule.

In one or more embodiments, the polyhydroxy compounds may be characterized by a boiling point that is in excess of 180° C., in other embodiments in excess of 200° C., in other embodiments in excess of 220° C., in other embodiments in excess of 240° C., and in other embodiments in excess of 260° C. at ambient atmospheric pressure.

Types of polyhydroxy compounds include di-hydroxy compounds, tri-hydroxy compounds, tetra-hydroxy compounds, and multi-hydroxy compounds. Polyhydroxy compounds may include aliphatic polyhydroxy compounds, cycloaliphatic polyhydroxy compounds, and aromatic polyhydroxy compounds.

Suitable di-hydroxy compounds include 1,2-ethanediol (also called ethylene glycol), 1,2-propanediol (also called propylene glycol), 1,3-propanediol (also called trimethylene glycol), 2,3-dimethyl-2,3-butanediol (also called pinacol), 2,2-dimethyl-1,3-propanediol (also called neopentylglycol), 1,2-butanediol, 1,3-butanediol, 1,4-butanediol, 2,3-butanediol, 1,2-pentanediol, 1,3-pentanediol, 1,4-pentanediol, 1,5-pentanediol, 2,3-pentanediol, 2,4-pentanediol, 1,2-hexanediol, 1,5-hexanediol, 1,6-hexanediol, 2,5-hexanediol, diethylene glycol, triethylene glycol, dipropylene glycol, diethanolamine, N-n-butyldiethanolamine, N-t-butyldiethanolamine, 3-diisopropylamino-1,2-propanediol, 1,2-cyclopentanediol, 1,3-cyclopentanediol, 1,2-cyclohexanediol, 1,3-cyclohexanediol, 1,4-cyclohexanediol, 3-methoxy-1,2-propanediol, and catechol.

Suitable tri-hydroxy compounds include 1,2,3-propanetriol (also called glycerol or glycerine), 2-hydroxymethyl-1,3-propanediol, 1,2,4-butanetriol, 1,1,1-tris(hydroxymethyl)ethane, 1,2,6-hexanetriol, 1,1,1-tris (hydroxymethyl) propane, 1,2,3-heptanetriol, 1,3,5-cyclohexanetriol, pyrogallol, triethanolamine, triisopropanolamine, 1-[N,N-bis(2-hydroxyethyl)amino]-2-propanol, and 2-deoxyribose.

Suitable tetra-hydroxy compounds include pentaerythritol, erythritol, threitol, 1,3-dihydroxyacetone dimer, glyceraldehyde dimer, fucose, 2-deoxy-galactose, and 2-deoxy-glucose.

Suitable multi-hydroxy compounds include glucose, allose, arabinose, lyxose, ribose, xylose, xylulose, galactose, mannose, tagatose, fructose, melibiose, arabitol, hexahydroxycyclohexane (also called inositol), xylitol, mannitol, and sorbitol.

The amount of the polyhydroxy compound introduced to the polymerization mixture may vary based upon several factors including the type and amount of catalyst used to initiate the polymerization as well as the type of polyhydroxy compound. In one or more embodiments, the amount of the polyhydroxy compound introduced to the polymerization mixture may be calculated based on the equivalents of active catalyst or active catalyst components that need to be quenched. For example, where an anionic polymerization initiator such as an alkyllithium is employed, the amount of the polyhydroxy compound required may be calculated based on the equivalents of lithium-alkyl group in the initiator. In other embodiments, such as where a coordination catalyst system (e.g., a lanthanide-, nickel- or cobalt-based catalyst) is employed, the amount of the polyhydroxy compound required may be calculated based upon the equivalents of aluminum-alkyl group in the catalyst system.

In one or more embodiments, the amount of the polyhydroxy compound introduced to the polymerization mixture may be such that the ratio of the equivalents of hydroxy group in the polyhydroxy compound to the equivalents of active catalyst or catalyst components to be quenched is equal to or greater than 1:1. Under such conditions, the polymerization mixture may be completely quenched.

In other embodiments, the amount of the polyhydroxy compound introduced to the polymerization mixture may be such that the ratio of the equivalents of hydroxy group in the polyhydroxy compound to the equivalents of active catalyst or catalyst components to be quenched is lower than 1:1. Under these conditions, the polymerization mixture may be partially quenched and therefore may be utilized to further react with a functionalizing agent or another quenching agent to give a final polymer product with tailored properties.

In one or more embodiments where an alkyllithium initiator is employed, the ratio of the equivalents of hydroxy group in the polyhydroxy compound to the equivalents of lithium-alkyl group in the initiator may be varied from about 0.1:1 about 10:1, in other embodiments from about 0.2:1 to about 5:1, and in still other embodiments from about 0.5:1 to about 2:1.

In other embodiments where a coordination catalyst system is employed, the ratio of the equivalents of hydroxy group in the polyhydroxy compound to the equivalents of aluminum-alkyl group in the catalyst system may be varied from about 0.1:1 about 10:1, in other embodiments from about 0.2:1 to about 5:1, and in still other embodiments from about 0.5:1 to about 2:1.

In one or more embodiments, the polyhydroxy compound may be added to the polymerization mixture at a location (e.g., within a vessel) where the functionalizing agent is added. In other embodiments, the polyhydroxy compound may be introduced to the polymerization mixture at a location that is distinct from where the functionalizing agent is added. For example, the polyhydroxy compound may be introduced to the polymerization mixture in downstream vessels including downstream reactors or tanks, in-line reactors or mixers, extruder, or devolatilizers.

In particular embodiments, the polymerization process is a continuous process where the introduction of the polyhydroxy compound occurs within a distinct zone of the process. For example, after the introduction of the functionalizing agent, which occurs within a particular zone of the process (e.g., a second zone), the polymerization mixture is removed from that zone and introduced to a subsequent zone, which may be referred to as a third zone, where the polyhydroxy compound is introduced to the polymerization mixture. In particular embodiments, the introduction of the polyhydroxy compound occurs within a zone sufficiently downstream from the zone where the functionalizing agent is introduced so as to provide sufficient time for the functionalizing agent to react with the reactive polymer.

In one or more embodiments, an antioxidant may be added along with, before, or after the introduction of the polyhydroxy compound to the polymerization mixture. Useful antioxidants include those known in the art such as 2,6-di-tert-butyl-4-methylphenol. In one or more embodiments, the amount of the antioxidant employed may be from about 0.2% to about 1% by weight of the polymer product. The antioxidant can be added as a neat material or, if necessary, dissolved in a solvent or monomer prior to being added to the polymerization mixture.

Once the polymerization mixture has been quenched by the polyhydroxy compound, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process. In one or more embodiments, the process of the present invention advantageously provides recycled monomer that is relatively free of contaminants. In particular embodiments, the recycled monomer is devoid or substantially devoid of polyhydroxy compounds, monohydroxy compounds, mono compounds, carboxylic acid compounds, and/or the residues thereof.

The polymer product may also be recovered from the polymerization mixture by using techniques known in the art. In one or more embodiments, desolventization and drying techniques may be used. For instance, especially where bulk polymerizations are conducted, the polymer can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

The polymer product produced by one or more embodiments of the present invention is advantageously characterized by reduced levels of metal salts that may derive from a reaction between the quenching agent and any metal compounds associated with the catalyst.

The polymer product prepared according to this invention may be employed in preparing tire components. These tire components can be prepared by using the polymer product of this invention alone or together with other rubbery polymers. Other rubbery polymers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery polymers may derive from the polymerization of ethylene together with one or more α-olefins and optionally one or more diene monomers.

Useful rubbery polymers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents (also called vulcanizing agents) may be employed, including sulfur or peroxide-based curing systems. Curing agents are described in *Kirk-Othmer*, ENCYCLOPEDIA OF CHEMICAL TECHNOLOGY, Vol. 20, pgs. 365-468, (3$^{rd}$ Ed. 1982), particularly Vulcanization Agents and Auxiliary Materials, pgs. 390-402, and A. Y. Coran, *Vulcanization*, ENCYCLOPEDIA OF POLYMER SCIENCE AND ENGINEERING, (2$^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These rubber compositions are useful for forming tire components such as treads, subtreads, black sidewalls, body ply skins, bead filler, and the like.

In one or more embodiments, the vulcanizable rubber composition may be prepared by forming an initial masterbatch that includes the rubber component and filler. This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mixing stage, which preferably does not initiate the vulcanization process. Optionally, additional mixing stages, sometimes called remills, can be employed between the masterbatch mixing stage and the final mixing stage. Various ingredients can be added during these remills. Rubber compounding techniques and the additives employed therein are generally known as disclosed in *The Compounding and Vulcanization of Rubber*, in *Rubber Technology* (2$^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including polymer of this invention and silica in the substantial absence of coupling and shielding agents.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In other embodiments, the polymer product of this invention may be employed in the manufacture of hoses, belts, shoe soles, seals in general including window seals, vibration damping rubber, and other industrial and consumer products.

In order to demonstrate the practice of the present invention, the following examples have been prepared and tested. The examples should not, however, be viewed as limiting the scope of the invention. The claims will serve to define the invention.

EXAMPLES

Example 1

In this example, 1,3-butadiene was polymerized into cis-1,4-polybutadiene by a continuous and essentially bulk polymerization process. Neat 1,3-Butadiene, 0.0335 M neodymium versatate (NdV$_3$) in hexane, and 0.68 M triisobutylaluminum (TIBA) in hexane were continuously fed to a catalyst aging vessel wherein the three components were in contact with each other for a period of 10 minutes. The catalyst aging vessel included a coiled tube having an inner diameter of about 1.1 cm and a length of about 122 m which was sufficiently long so as to provide the desired residence time and whose inside tube diameter was such that a turbulent velocity profile of the flow components was achieved. The aged mixture of 1,3-butadiene, TIBA and NdV$_3$ was fed to a continuous polymerization reactor where it was mixed with a continuous stream of 0.070 M ethylaluminum dichloride (EADC) in hexane. The reactor was equipped with a mechanical agitator capable of mixing high viscosity polymer cement and with a reflux condenser which was used to control the rate of 1,3-butadiene vaporization/condensation and hence control the cement temperature within the reactor. Specifically, by controlling the flow of chilled water to the condenser, the rate of 1,3-butadiene vaporization/condensation was maintained to allow for the isothermal operation of the reactor. The above-mentioned mixture of 1,3-butadiene and the catalyst spent an average residence time of 18 minutes at 29° C. in the reactor, during which time the 1,3-butadiene was polymerized to a conversion of about 10%. The resulting polymer cement was continuously withdrawn from the reactor via a progressive cavity pump wherein a stream of 0.010 M N,N,N',N'-tetramethylethylenediamine (TMEDA) in hexane, which was used as a polymerization inhibitor, was introduced and mixed into the cement. The progressive cavity pump was also responsible for controlling the liquid level in the polymerization reactor. After passing the progressive cavity pump, the cement was fed to an inline mixer wherein a stream of 0.010 M di-n-octyltin bis(2-ethylhexylmaleate (DOTBOM) in hexane, which was used as a coupling agent, was introduced and mixed into the cement. The cement was then transferred to another agitated reactor that provided suitable residence time for the reaction between the reactive polymer and the coupling agent. The cement was subsequently quenched with a stream of ethylene glycol in order to deactivate any remaining reactive polymer and the catalyst. The cement was further stabilized by the addition of an antioxidant stream consisting of a mixture of Irganox™ 1076 and Irganox™ 1520 dissolved in 1,3-butadiene. The final cement was sent to a devolatilizer for removal of the unreacted monomer from the polymer. The resulting polymer was extruded from the devolatilizer by using an extruder.

The Mooney viscosity ($ML_{1+4}$) of the polymer exiting the extruder was determined to be 32.4 at 100° C. by using a Monsanto Mooney viscometer with a large rotor, a one-minute warm-up time, and a four-minute running time. As determined by gel permeation chromatography (GPC), the polymer had a number average molecular weight ($M_n$) of 88,300, a weight average molecular weight ($M_w$) of 344,500, and a molecular weight distribution ($M_w/M_n$) of 3.9. The NMR spectroscopic analysis of the polymer indicated a cis-1,4-linkage content of 99.1%, a trans-1,4-linkage content of 0.6%, and a 1,2-linkage content of 0.3%.

In conducting the above experiment, a 1,3-butadiene feed rate of 0.97 lb/min was used to achieve the desired reactor residence time. The feed rates of the catalyst components were maintained at levels to achieve a $NdV_3$ loading of 0.0156 mmol per 100 g of 1,3-butadiene and a Nd/TIBA/EADC molar ratio of 1:80:1.5. TMEDA was fed at a rate to achieve a TMEDA/Nd molar ratio of 1:1. DOTBOM was fed at a rate to achieve a DOTBOM/Nd molar ratio of 0.5:1. Ethylene glycol was added at a rate to completely deactivate TIBA and EADC. Since one hydroxy group will react with one aluminum-alkyl bond, about 1.5 moles of ethylene glycol is needed for deactivating one mole of TIBA, and about half mole of ethylene glycol is needed for deactivating one mole of EADC. Irganox™ 1076 and Irganox™ 1520 were added at levels of 0.3 and 0.08 parts by weight per 100 parts by weight of the polymer product, respectively.

Example 2

Comparative Example

A similar experiment to that described Example 1 was conducted by using distilled tall oil in place of ethylene glycol as the quenching agent. Distilled tall oil is a product derived from the production of paper and comprises a mixture of long-chain carboxylic acids. The molar amount of distilled tall oil used was twice the molar amount of ethylene glycol used in Example 1, because each distilled tall oil molecule contains only one active carboxy group, whereas each ethylene glycol molecule contains two active hydroxy groups. The polymer exiting the extruder had the following properties: $ML_{1+4}$=29.4, $M_n$=95,200, $M_w$=428,300, $M_w/M_n$=4.5, cis-1,4-linkage=99.1%, trans-1,4-linkage=0.6%, and 1,2-linkage=0.3%.

Examples 3

A similar experiment to that described Example 1 was conducted by using 1,5-pentanediol in place of ethylene glycol as the quenching agent. The polymer exiting the extruder had the following properties: $ML_{1+4}$=39.3, $M_n$=93,400, $M_w$=381,900, $M_w/M_n$=4.1, cis-1,4-linkage=99.0%, trans-1,4-linkage=0.7%, and 1,2-linkage=0.3%.

Example 4 and Example 5

Comparative Example

The polymer samples produced in Example 1 and Example 2 by using ethylene glycol and distilled tall oil, respectively, as the quenching agent were evaluated in a carbon black filled rubber compound, the composition of which is summarized in Table 1. The numbers in the table are expressed as parts by weight per hundred parts by weight of rubber (phr).

TABLE 1

| | Example No. | |
| --- | --- | --- |
| | Example 4 | Example 5 (Comparative Example) |
| Polymer used | from Example 1 | from Example 2 |
| Polymer type | quenched with ethylene glycol | quenched with distilled tall oil |
| Polymer | 100 | 100 |
| Carbon black | 50 | 50 |
| Oil | 10 | 10 |
| Antidegradants | 2.5 | 2.5 |
| Stearic acid | 2 | 2 |
| Zinc oxide | 2 | 2 |
| Accelerators | 1.2 | 1.2 |
| Sulfur | 1.3 | 1.3 |
| Total | 169 | 169 |

The polymer, carbon black, oil, antidegradants, and stearic acid were mixed as a master batch in a 300-g Brabender mixer and dropped at 145° C. The master batch was then mixed with zinc oxide, sulfur and accelerators and dropped at 102° C. The sheeted final batch was cured at 145° C. for 33 minutes. The properties of the vulcanizates are summarized in the Table 2.

TABLE 2

| | Example No. | |
| --- | --- | --- |
| | Example 4 | Example 5 (Comparative Example) |
| Polymer used | from Example 1 | from Example 2 |
| Polymer type | quenched with ethylene glycol | quenched with distilled tall oil |
| Compound ML at 130° C. | 69.2 | 45.8 |
| Rebound | 59.8 | 58.4 |
| Lambourn wear rate: | | |
| at 25% slip ratio | 0.0290 | 0.0680 |
| at 65% slip ratio | 0.0160 | 0.0600 |
| Crack growth: | | |
| dc/dn at 8% strain (nm/cycle) | 103 | 763 |
| tear energy input ($KJ/m^2$) | 1121 | 1187 |

TABLE 2-continued

| | Example No. | |
|---|---|---|
| | Example 4 | Example 5 (Comparative Example) |
| Ring tear: | | |
| tear strength (N/mm) | 42.07 | 27.89 |
| travel at tear (%) | 681 | 484 |
| Ring tensile: | | |
| M50 (MPa) | 1.01 | 0.94 |
| M100 (MPa) | 1.64 | 1.61 |
| M300 (MPa) | 5.34 | 5.81 |
| stress at break (MPa) | 12.23 | 10.74 |
| elongation at break (%) | 536 | 463 |
| toughness (MPa) | 27.92 | 21.15 |
| Strain Sweep at 50° C.: | | |
| G' at 2% strain (MPa) | 3.45 | 3.09 |
| tan δ at 2% strain | 0.168 | 0.156 |
| Strain Sweep at 0° C.: | | |
| G' at 2% strain (MPa) | 4.65 | 4.44 |
| tan δ at 2% strain | 0.210 | 0.206 |

Although the polymer samples obtained in Examples 1 and 2 give similar tensile moduli (M50, M100, M300), dynamic modulus (G') and hysteresis (tan δ), the polymer obtained in Example 1 (i.e., with ethylene glycol as the quenching agent) shows significant advantages over the polymer obtained in Example 2 (i.e., with distilled tall oil as the quenching agent) in terms of other properties. For example, Lambourn wear rates of the polymer obtained in Example 1 are lower by 50% and 75% at 25% slip and 65% slip ratios, respectively, as compared to the polymer obtained in Example 2. At almost equal tear energy input, the crack growth rate (dc/dn) of the polymer obtained in Example 1 is lower by 86%. In addition, the polymer obtained in Example 1 gives 32% higher toughness, 51% higher ring tear strength, and 16% higher elongation at break.

Example 6

Comparative Example

A similar experiment to that described Example 1 was conducted by using n-hexanol in place of ethylene glycol as the quenching agent. It was found that the recycled 1,3-butadiene was contaminated with n-hexanol due to the low boiling point of n-hexanol. As a result, the polymerization became progressively slower due to the build-up of n-hexanol in the recycled monomer feed.

Example 7

Comparative Example

A similar experiment to that described Example 1 was conducted by using distilled water in place of ethylene glycol as the quenching agent. It was found that the recycled 1,3-butadiene was contaminated with water due to the low boiling point of water. As a result, the polymerization became progressively slower due to the build-up of water in the recycled monomer feed.

Various modifications and alterations that do not depart from the scope and spirit of this invention will become apparent to those skilled in the art. This invention is not to be duly limited to the illustrative embodiments set forth herein.

What is claimed is:

1. A method for quenching an active polymerization mixture, the method comprising:
    (i) preparing a propagating polymer by employing a coordination catalyst within an active polymerization mixture; and
    (ii) protonating the propagating polymer by introducing a polyhydroxy compound to the active polymerization mixture containing the propagating polymer, where the polyhydroxy compound has an equivalent molecular weight, defined by the molecular weight of the polyhydroxy compound divided by the number hydroxyl groups per molecule, of less than 80 g/mole.

2. The method of claim 1, where the active polymerization mixture includes an active catalyst.

3. The method of claim 2, where the active polymerization mixture includes less than 20% by weight solvent based on the total weight of the mixture.

4. A method for preparing a polymer, the method comprising the steps of:
    (a) introducing monomer and an anionic polymerization initiator to form an active polymerization mixture that includes less than 20% by weight of solvent, where the active polymerization mixture includes a propagating polymer;
    (b) adding a functionalizing agent to the active polymerization mixture; and
    (c) adding a polyhydroxy compound to the active polymerization mixture to form a deactivated polymerization mixture.

5. The method of claim 4, where the anionic polymerization initiator includes an alkyllithium compound.

6. The method of claim 1, where the coordination catalyst system includes a lanthanide-based catalyst system.

7. The method of claim 1, where the coordination catalyst system includes a cobalt-based catalyst system.

8. The method of claim 1, where the coordination catalyst system includes a nickel-based catalyst system.

9. The method of claim 1, further comprising the step of adding a functionalizing agent to the active polymerization mixture prior to the step of protonating the propagating polymer.

10. The method of claim 4, where the polyhydroxy compound is characterized by an equivalent molecular weight of less than 100 g/mole.

11. The method of claim 4, where the polyhydroxy compound is characterized by a boiling point in excess of 180° C.

12. The method of claim 4, where the polyhydroxy compound is selected from the group consisting of di-hydroxy compounds, tri-hydroxy compounds, tetra-hydroxy compounds and multi-hydroxy compounds.

13. The method of claim 4, where the polyhydroxy compound is selected from the group consisting of aliphatic polyhydroxy compounds, cycloaliphatic polyhydroxy compounds, and aromatic polyhydroxy compounds.

14. The method of claim 4, where the polyhydroxy compound is selected from the group consisting of 1,2-ethanediol, 1,2-propanediol, 1,3-propanediol, 2,3-dimethyl-2,3-butanediol, 2,2-dimethyl-1,3-propanediol, 1,2-butanediol, 1,3-butanediol, 1,4-butanediol, 2,3-butanediol, 1,2-pentanediol, 1,3-pentanediol, 1,4-pentanediol, 1,5-pentanediol, 2,3-pentanediol, 2,4-pentanediol, 1,2-hexanediol, 1,5-hexanediol, 1,6-hexanediol, 2,5-hexanediol, diethylene glycol, triethylene glycol, dipropylene glycol, diethanolamine, N-n-butyldiethanolamine, N-t-butyldiethanolamine, 3-diisopropylamino-1,2-propanediol, 1,2-cyclopentanediol, 1,3- cyclopentanediol, 1,2-cyclohexanediol, 1,3-cyclohexanediol, 1,4-cyclohexanediol, 3-methoxy-1,2-propanediol, and catechol.

15. The method of claim 4, where the polyhydroxy compound is selected from the group consisting of 1,2,3-propanetriol, 2-hydroxymethyl-1,3-propanediol, 1,2,4-butanetriol, 1,1,1-tris (hydroxymethyl)ethane, 1,2,6-hexanetriol, 1,1,1-tris(hydroxymethyl)propane, 1,2,3-heptanetriol, 1,3,5-cyclohexanetriol, pyrogallol, triethanolamine, triisopropanolamine, 1-[N,N-bis(2-hydroxyethyl)amino]-2-propanol, and 2-deoxyribose.

16. The method of claim 4, where the polyhydroxy compound is selected from the group consisting of pentaerythritol, erythritol, threitol, 1,3-dihydroxyacetone dimer, glyceraldehyde dimer, fucose, 2-deoxy-galactose, and 2-deoxy-glucose.

17. The method of claim 4, where the polyhydroxy compound is selected from the group consisting of glucose, allose, arabinose, lyxose, ribose, xylose, xylulose, galactose, mannose, tagatose, fructose, melibiose, arabitol, hexahydroxycyclohexane, xylitol, mannitol, and sorbitol.

18. The method of claim 4, further comprising the step of removing monomer from the deactivated polymerization mixture to form a recycled monomer stream that is substantially devoid of the polyhydroxy compound.

19. A continuous polymerization method for preparing a polymer, the method comprising the steps of:
  (a) continuously introducing monomer including conjugated diene monomer, and a catalyst to form an active polymerization mixture that includes less than 20% by weight of solvent;
  (b) allowing at least a portion of the monomer to polymerize within a polymerization zone to form a propagating polymer within the active polymerization mixture;
  (c) continuously transferring the active polymerization mixture to a deactivation zone;
  (d) continuously introducing a polyhydroxy compound to the active polymerization mixture within the deactivation zone to form a deactivated polymerization mixture, where the polyhydroxy compound has an equivalent molecular weight, defined by the molecular weight of the polyhydroxy compound divided by the number hydroxyl groups per molecule, of less than 80 g/mole; and
  (e) continuously removing monomer from the deactivated polymerization mixture to form a recycled monomer stream that is substantially devoid of the polyhydroxy compound.

20. The method of claim 1, where the equivalent weight of the polyhydroxy compound is less than 60 g/mole.

21. The method of claim 1, where the equivalent weight of the polyhydroxy compound is less than 40 g/mole.

22. The method of claim 19, where the equivalent weight of the polyhydroxy compound is less than 60 g/mole.

23. The method of claim 19, where the equivalent weight of the polyhydroxy compound is less than 40 g/mole.

24. A method for preparing a polymer, the method comprising the steps of:
  (a) introducing monomer and a catalyst to form an active polymerization mixture that includes less than 20% by weight of solvent, where the catalyst system includes a nickel-based coordination catalyst system; and
  (b) adding a polyhydroxy compound to the active polymerization mixture.

25. A method for preparing a polymer, the method comprising the steps of:
  (a) introducing monomer and a catalyst to form an active polymerization mixture that includes less than 20% by weight of solvent, where the monomer includes conjugated diene monomer and optionally monomer copolymerizable therewith;
  (b) adding a functionalizing agent to the active polymerization mixture; and
  (c) adding a polyhydroxy compound to the active polymerization mixture after said step of adding a functionalizing agent, where the polyhydroxy compound has an equivalent molecular weight, defined by the molecular weight of the polyhydroxy compound divided by the number hydroxyl groups per molecule, of less than 80 g/mole.

26. The method of claim 25, where the polyhydroxy compound has an equivalent molecular weight of less than 60 g/mole.

27. The method of claim 25, where the polyhydroxy compound has an equivalent molecular weight of less than 40 g/mole.

28. The method of claim 25, where the active polymerization mixture includes a propagating polymer, and where said step of adding a polyhydroxy compound protonates the propagating polymer.

29. The method of claim 25, where the polyhydroxy compound is characterized by a boiling point in excess of 180° C.

30. The method of claim 25, where the polyhydroxy compound is selected from the group consisting of 1,2-ethanediol, 1,2-propanediol, 1,3-propanediol, 2,3-dimethyl-2,3-butanediol, 2,2-dimethyl-1,3-propanediol, 1,2-butanediol, 1,3-butanediol, 1,4-butanediol, 2,3-butanediol, 1,2-pentanediol, 1,3-pentanediol, 1,4-pentanediol, 1,5-pentanediol, 2,3-pentanediol, 2,4-pentanediol, 1,2-hexanediol, 1,5-hexanediol, 1,6-hexanediol, 2,5-hexanediol, diethylene glycol, triethylene glycol, dipropylene glycol, diethanolamine, N-n-butyldiethanolamine, N-t-butyldiethanolamine, 3-diisopropylamino-1,2-propanediol, 1,2-cyclopentanediol, 1,3-cyclopentanediol, 1,2-cyclohexanediol, 1,3-cyclohexanediol, 1,4-cyclohexanediol, 3-methoxy-1,2-propanediol, and catechol.

31. The method of claim 25, where the polyhydroxy compound is selected from the group consisting of 1,2,3-propanetriol, 2-hydroxymethyl-1,3-propanediol, 1,2,4-butanetriol, 1,1,1-tris(hydroxymethyl)ethane, 1,2,6-hexanetriol, 1,1,1-tris(hydroxymethyl)propane, 1,2,3-heptanetriol, 1,3,5-cyclohexanetriol, pyrogallol, triethanolamine, triisopropanolamine, 1-[N,N-bis(2-hydroxyethyl)amino]-2-propanol, and 2-deoxyribose.

32. The method of claim 25, where the polyhydroxy compound is selected from the group consisting of pentaerythritol, erythritol, threitol, 1,3-dihydroxyacetone dimer, glyceraldehyde dimer, fucose, 2-deoxy-galactose, and 2-deoxy-glucose.

33. The method of claim 25, where the polyhydroxy compound is selected from the group consisting of glucose, allose, arabinose, lyxose, ribose, xylose, xylulose, galactose, mannose, tagatose, fructose, melibiose, arabitol, hexahydroxycyclohexane, xylitol, mannitol, and sorbitol.

34. The method of claim 25, further comprising the step of removing monomer from the polymerization mixture after said step of adding a polyhydroxy compound, thereby forming a recycled monomer stream that is substantially devoid of the polyhydroxy compound.

35. The method of claim 19, further comprising the step of continuously transferring the active polymerization mixture from the polymerization zone to a functionalization zone and continuously introducing a functionalizing agent to the active polymerization mixture within the functionalizing zone prior to said step of transferring the active polymerization mixture to the deactivation zone.

36. A continuous polymerization method for preparing a polymer, the method comprising the steps of:
  (a) continuously introducing monomer, where the monomer includes conjugated diene monomer and a catalyst to form an active polymerization mixture that includes less than 20% by weight of solvent;
  (b) allowing at least a portion of the monomer to polymerize within a polymerization zone to form a propagating polymer within the active polymerization mixture;
  (c) continuously transferring the active polymerization mixture to a deactivation zone;
  (d) continuously introducing a polyhydroxy compound to the active polymerization mixture within the deactivation zone to form a deactivated polymerization mixture, where the polyhydroxy compound has an equivalent molecular weight, defined by the molecular weight of the polyhydroxy compound divided by the number hydroxyl groups per molecule, of less than 80 g/mole;
  (e) continuously removing monomer from the deactivated polymerization mixture to form a recycled monomer stream that is substantially devoid of the polyhydroxy compound; and
  (f) transferring the active polymerization mixture from the polymerization zone to a functionalization zone and continuously introducing a functionalizing agent to the active polymerization mixture within the functionalizing zone prior to said step of transferring the active polymerization mixture to the deactivation zone.

37. The method of claim 19, where the monomer consists essentially of conjugated diene monomer and optionally vinyl aromatic monomer.

* * * * *